(12) United States Patent
Goji et al.

(10) Patent No.: US 12,290,722 B2
(45) Date of Patent: May 6, 2025

(54) AQUEOUS ADHESIVE FOR TENNIS BALL

(71) Applicant: Sumitomo Rubber Industries, Ltd., Hyogo (JP)

(72) Inventors: Sho Goji, Kobe (JP); Takehiko Hyodo, Kobe (JP); Kazuyoshi Shiga, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 516 days.

(21) Appl. No.: 17/684,572

(22) Filed: Mar. 2, 2022

(65) Prior Publication Data

US 2022/0280841 A1 Sep. 8, 2022

(30) Foreign Application Priority Data

Mar. 3, 2021 (JP) .................................. 2021-033950

(51) Int. Cl.
*A63B 39/08* (2006.01)
*C09J 109/00* (2006.01)
*A63B 102/02* (2015.01)

(52) U.S. Cl.
CPC ............. *A63B 39/08* (2013.01); *C09J 109/00* (2013.01); *A63B 2102/02* (2015.10)

(58) Field of Classification Search
CPC ..... C09J 109/00; A63B 2102/02; A63B 39/08
See application file for complete search history.

(56) References Cited

U.S. PATENT DOCUMENTS 6,127,476 A * 10/2000 Jialanella ............... C09J 113/02
423/604
2020/0109318 A1 4/2020 Hyodo et al.

FOREIGN PATENT DOCUMENTS

| EP | 3995184 A | 5/2022 |
|---|---|---|
| JP | S57-179265 A | 11/1982 |
| JP | S6321544 B2 * | 5/1988 |
| JP | 2000-328030 A | 11/2000 |
| JP | 2004-148022 A | 5/2004 |
| JP | 2020-059838 A | 4/2020 |
| WO | 2021/024835 A1 | 2/2021 |

OTHER PUBLICATIONS

Table 2 of JP-S6321544-B2, Obtained on Sep. 25, 2024 at https://translate.google.com/?sl=auto&tl=en&op=translate (Year: 1988).*
English Machine Translation JP-S6321544-B2 Obtained Sep. 25, 2024 via STIC (Year: 1988).*
The extended European search report issued by the European Patent Office on Aug. 5, 2022, which corresponds to European Patent Application No. 22158631.6, and is related to U.S. Appl. No. 17/684,572.
Database WPI, Week 202101, Thomson Scientific London, GB; AN 2021-150485, XP002807183, & WO 2021/024835 A1, Feb. 11, 2021.
Database WPI, Week 200116, Thomson Scientific London, GB; AN 2001-1516334, XP002807184, & JP 2000-328030 A, Nov. 28, 2000.

* cited by examiner

*Primary Examiner* — Arrie L Reuther
*Assistant Examiner* — Devin Mitchell Darling
(74) *Attorney, Agent, or Firm* — Studebaker Brackett PLLC

(57) ABSTRACT

The aqueous adhesive for a tennis ball includes rubber latex. The rubber latex is a mixture of liquid rubber latex and solid rubber latex. A ratio of liquid rubber to an entire rubber component contained in the rubber latex is greater than 20% by weight and less than 90% by weight in terms of solid content. The tennis ball includes a seam formed of the aqueous adhesive for a tennis ball.

10 Claims, 2 Drawing Sheets

AQUEOUS ADHESIVE FOR TENNIS BALL

CROSS-REFERENCE TO RELATED APPLICATION

This application claims priority on and the benefit of Patent Application No. 2021-033950 filed in JAPAN on Mar. 3, 2021. The entire disclosures of this Japanese Patent Application are hereby incorporated by reference.

BACKGROUND OF THE INVENTION

Field of the Invention

The present disclosure relates to aqueous adhesives for tennis balls. More specifically, the present disclosure relates to aqueous adhesives used for producing regulation tennis balls.

Description of the Related Art

A tennis ball includes a core. The core is a hollow sphere. The core is formed by adhering two hemispherical half cores to each other. The two half cores are adhered to each other by using an adhesive. An outer surface of the core is covered with two pieces of dumbbell-shaped felt (also referred to as melton). The melton is also adhered to the outer surface of the core by using an adhesive. A seam portion is formed in a gap between the two pieces of the melton.

Seam glue is used for forming the seam portion. The seam glue is formed of a rubber composition in general. JP2004-148022 (Patent Literature 1) discloses solvent-based seam glue obtained by dissolving a rubber composition including base rubber such as natural rubber and the like, titanium oxide, sulfur, and the like in an organic solvent such as naphtha or the like.

The seam glue is adhered to a side surface of melton before the melton is adhered to the core. For example, multiple pieces of melton are stacked and thereafter immersed in seam glue, whereby the seam glue is adhered to the side surfaces of the stacked pieces of the melton. The adhered seam glue is dried, and the multiple pieces of the melton are thereafter separated one by one, thereby obtaining melton having the seam glue adhered to the side surface. Two pieces of the melton are adhered to the outer surface of the core by an adhesive, and thereafter crosslinked, thereby forming a seam portion in a gap between the two pieces of the melton.

In this production method, tackiness for adhering multiple pieces of melton to each other by seam glue formed of an unvulcanized rubber composition after drying, and separability for separating, one by one, the multiple pieces of the melton adhered to each other in the subsequent process step of adhering the melton to the core, are required. Furthermore, transition resistance for preventing the dried seam glue from adhering to another member and the like is also required.

In recent years, in light of influence on the environment and reduction of load on workers, aqueous adhesives have been required instead of solvent-based adhesives. JP2020-059838 (Patent Literature 2) indicates that an aqueous adhesive, for a tennis ball, containing rubber latex and a sulfenamide-based vulcanization accelerator is used for adhering half cores to each other. JP57-179265 (Patent Literature 3) discloses a melton-seaming adhesive in which depolymerized natural rubber latex and/or synthetic rubber latex is used as a base material component.

In the solvent-based seam glue disclosed in Patent Literature 1, a rubber composition obtained by adding various chemicals to solid rubber such as natural rubber and the like and kneading the obtained product, is used. During the kneading, the solid rubber is peptized. The rubber component has a low molecular weight through the peptization, thereby obtaining tackiness, separability, and transition resistance appropriate for forming a seam portion. Meanwhile, the aqueous adhesive disclosed in Patent Literature 2 can be produced by, for example, adding a slurry of a vulcanization accelerator or the like to natural rubber latex. The molecular weight of the aqueous adhesive is not lowered since no kneading is performed during the production. Therefore, tackiness and separability equivalent to those of solvent-based seam glue cannot be obtained. For the melton-seaming adhesive disclosed in Patent Literature 3, depolymerization of rubber latex is required, thereby complicating the production process steps. Furthermore, there is still room for improvement in tackiness, separability, and transition resistance of an adhesive in which depolymerized rubber latex is used.

An object of the present disclosure is to provide an aqueous adhesive, for a tennis ball, which has excellent tackiness and separability, and further has excellent transition resistance, and which allows a seam to be efficiently formed.

SUMMARY OF THE INVENTION

An aqueous adhesive, for a tennis ball, according to the present disclosure includes rubber latex. The rubber latex is a mixture of liquid rubber latex and solid rubber latex. A ratio of liquid rubber to an entire rubber component contained in the rubber latex is greater than 20% by weight and less than 90% by weight in terms of solid content.

A tennis ball according to the present disclosure includes: a core; two pieces of felt covering the core; and a seam positioned in a gap between the two pieces of the felt. The seam is formed of the above-described aqueous adhesive.

The aqueous adhesive, for a tennis ball, according to the present disclosure has tackiness, separability, and transition resistance which are appropriate for forming the seam. The tennis ball including the seam formed of the aqueous adhesive has excellent durability.

DESCRIPTION OF THE PREFERRED EMBODIMENTS

Figure 1:
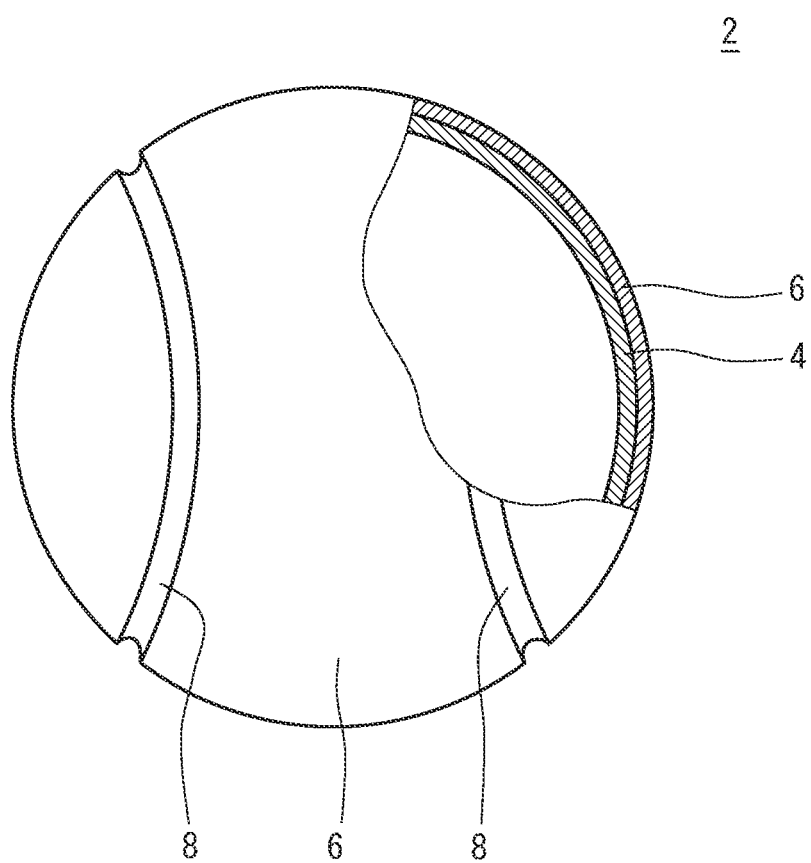
FIG. 1 is a partially cutaway cross-sectional view of a tennis ball obtained by using an adhesive according to one embodiment of the present disclosure.

The following will describe in detail the present disclosure based on preferred embodiments with appropriate reference to the accompanying drawing.

An aqueous adhesive, for a tennis ball, according to one embodiment of the present disclosure contains rubber latex. The rubber latex is a mixture of liquid rubber latex and solid rubber latex. In the description herein, the rubber latex represents an emulsion in which a rubber component in particulate form is dispersed in a dispersion medium such as_ water, an aqueous solution, or the like. Liquid rubber represents rubber having fluidity at normal temperature under atmospheric pressure. The liquid rubber latex represents an emulsion in which the liquid rubber in particulate form is dispersed in a dispersion medium. Solid rubber represents rubber that does not flow at normal temperature under atmospheric pressure. The solid rubber latex represents an emulsion in which the solid rubber in particulate form is dispersed in a dispersion medium.

In the rubber latex contained in the aqueous adhesive for a tennis ball, particulates formed of the liquid rubber and particulates formed of the solid rubber are dispersed in a dispersion medium such as water, an aqueous solution, or the like. A ratio of the liquid rubber to the entire rubber component in the rubber latex is greater than 20% by weight and less than 90% by weight in terms of solid content.

The aqueous adhesive in which a ratio of the liquid rubber to the entire rubber component is greater than 20% by weight in terms of solid content has excellent tackiness and separability in an unvulcanized state after drying. The aqueous adhesive allows a plurality of pieces of melton to be easily adhered to each other, and allows the adhered pieces of the melton to be separated without deformation. The aqueous adhesive in which the ratio is less than 90% by weight has excellent transition resistance in an unvulcanized state after drying. The aqueous adhesive does not adhere to another member also in the unvulcanized state after drying, and has good processability. Furthermore, the aqueous adhesive substantially contains no organic solvent. The aqueous adhesive allows reduction of load on the environment and load on workers who use the aqueous adhesive.

In light of obtaining good tackiness and separability, the ratio of the liquid rubber to the entire rubber component is preferably not less than 25% by weight and more preferably not less than 30% by weight. In light of excellent transition resistance, the ratio is preferably not greater than 85% by weight and more preferably not greater than 80% by weight.

A kind of each of the liquid rubber latex and the solid rubber latex is not particularly limited as long as tackiness, separability, and transition resistance are appropriately obtained. Examples of a rubber component in each of the liquid rubber latex and the solid rubber latex include styrene-butadiene rubber, acrylonitrile-butadiene rubber, chloroprene rubber, butadiene rubber, isoprene rubber, isobutylene-isoprene rubber, ethylene-propylene rubber, and modified products thereof. Examples of the modified products include rubber modified with a functional group such as a carboxyl group, an amine group, a hydroxy group, and the like. Isoprene rubber or natural rubber is preferable since sulfur (vulcanizing agent) which may cause coloring after vulcanization need not be blended. Crosslinking caused by protein, phospholipid, or the like in natural rubber latex may unintentionally increase a green strength. In light of production stability, the rubber component is more preferably isoprene rubber.

In light of tackiness and separability, the Mooney viscosity ($ML_{1+4}$ ($100°$ C.)) of the rubber component in the rubber latex is preferably not greater than 6.0, more preferably not greater than 5.0, and particularly preferably not greater than 4.0. In light of the transition resistance, the Mooney viscosity of the rubber component is preferably not less than 2.0. The molecular weight and the molecular weight distribution of the rubber component exert an influence on the Mooney viscosity. In the aqueous adhesive, the liquid rubber is blended in the solid rubber at a predetermined ratio, whereby the average molecular weight of the obtained rubber component is lowered, and the molecular weight distribution is widened. As a result, the Mooney viscosity of the rubber component is appropriately adjusted, and the effect according to the present disclosure becomes more significant.

The Mooney viscosity ($ML_{1+4}$ ($100°$ C.)) of the rubber component in the rubber latex is measured in accordance with the standard of "JIS K6300" after the rubber latex in which the liquid rubber latex and the solid rubber latex are blended at a predetermined ratio is dried to remove a water content. The measurement conditions are as follows.

Rotor: L rotor
Preheating time: 1 minute
Rotating time of rotor: 4 minutes
Temperature: $100°$ C.

The number average molecular weight of the liquid rubber contained in the liquid rubber latex is not particularly limited as long as the effect according to the present disclosure is obtained, and can be selected as appropriate according to the kind. In light of easily obtaining good tackiness, separability, and transition resistance, the number average molecular weight of the liquid rubber is preferably not greater than 60,000 and more preferably not greater than 40,000. Meanwhile, the number average molecular weight of the liquid rubber is preferably not less than 10,000 and more preferably not less than 20,000.

The number average molecular weight of the solid rubber contained in the solid rubber latex is not particularly limited as long as the effect according to the present disclosure is obtained, and can be selected as appropriate according to the kind. In light of easily obtaining good tackiness, separability, and transition resistance, the number average molecular weight of the solid rubber is preferably not greater than 3,000,000 and more preferably not greater than 2,000,000. Meanwhile, the number average molecular weight of the solid rubber is preferably not less than 500,000 and more preferably not less than 1,000,000.

In light of miscibility with various additives described below, a solid content concentration of the rubber latex is preferably not greater than 80% by weight and more preferably not greater than 70% by weight. In light of adhesive strength, the solid content concentration of the rubber latex is preferably not less than 20% by weight and more preferably not less than 30% by weight. The solid content concentration of the rubber latex is obtained in accordance with the method described in JIS K6387-2 "Latex, rubber-Determination of total solids content".

The aqueous adhesive for a tennis ball preferably contains a vulcanization accelerator in addition to the rubber latex. A kind of the vulcanization accelerator is not particularly limited as long as the effect according to the present disclosure is not inhibited. The vulcanization accelerator is selected as appropriate from aldehyde-ammonia-based vulcanization accelerators, aldehyde-amine-based vulcanization accelerators, thiazole-based vulcanization accelerators, sulfenamide-based vulcanization accelerators, thiuram-based vulcanization accelerators, dithiocarbamate-based vulcanization accelerators, guanidine-based vulcanization accelerators, thiourea-based vulcanization accelerators, xanthate-based vulcanization accelerators, and the like, and used. One of the vulcanization accelerators may be used or two or more of the vulcanization accelerators may be used in combination. Thiuram-based vulcanization accelerators are preferably used since sulfur-free vulcanization in which sulfur (vulcanizing agent) that may cause coloring after vulcanization is not used, can be performed.

In a case where a thiuram-based vulcanization accelerator and another vulcanization accelerator are used in combination, a proportion of the thiuram-based vulcanization accelerator to the entire vulcanization accelerator is preferably not less than 50% by weight, more preferably not less than 55% by weight, and particularly preferably not less than 60% by weight.

In light of seaming strength after vulcanization, an amount of the vulcanization accelerator contained in the aqueous adhesive is preferably not less than 1.5 parts by weight and more preferably not less than 2.5 parts by weight with respect to 100 parts by weight of the rubber component in terms of solid content. In light of fluidity during vulcanization, the amount of the vulcanization accelerator contained in the aqueous adhesive is preferably not greater than 3.5 parts by weight and more preferably not greater than 3.0 parts by weight in terms of solid content.

The aqueous adhesive may contain a vulcanizing agent as necessary. Preferable examples of the vulcanizing agent include sulfur such as powdery sulfur, insoluble sulfur, precipitated sulfur, colloidal sulfur, and the like; and sulfur compounds such as morpholine disulfide, alkylphenol disulfide, and the like. Sulfur blended as the vulcanizing agent may cause coloring of the obtained seam. Therefore, the aqueous adhesive that substantially contains no sulfur is preferable. In the description herein, sulfur represents sulfur as a single element such as powdery sulfur and the like.

The aqueous adhesive may contain an inorganic filler as long as the effect according to the present disclosure is obtained. One kind of an inorganic filler or two or more kinds of inorganic fillers selected from the group consisting of silica, carbon black, calcium carbonate, calcium hydroxide, magnesium hydroxide, talc, mica, diatomaceous earth, titanium oxide, zinc oxide, bismuth oxide, barium sulfate, magnesium carbonate, and alumina is preferable. In light of strength of the formed seam, an amount of the inorganic filler in the aqueous adhesive is preferably not less than 5 parts by weight and more preferably not less than 15 parts by weight with respect to 100 parts by weight of the entire rubber component in terms of solid content. In light of fluidity during vulcanization, the amount of the inorganic filler is preferably not greater than 40 parts by weight and more preferably not greater than 30 parts by weight in terms of solid content.

The aqueous adhesive may further contain various additives such as a vulcanization acceleration aid, a thickener, a tackifier, an anti-aging agent, an antioxidant, a light stabilizer, a softener, a processing aid, a coloring agent, and the like as long as the effect according to the present disclosure is not inhibited.

A concentration of the total solid content contained in the aqueous adhesive is not particularly limited as long as the effect according to the present disclosure is obtained. In light of strength of the obtained seam, the solid content concentration is preferably not less than 5.0% by weight and more preferably not less than 10% by weight. In light of fluidity during vulcanization, the solid content concentration is preferably not greater than 80% by weight and more preferably not greater than 70% by weight.

In light of obtaining good tackiness, separability, and transition resistance, the Mooney viscosity ($ML_{1+4}$ (100° C.)) of the aqueous adhesive is preferably not greater than 10, more preferably not greater than 8, and particularly preferably not greater than 6. In light of the transition resistance, the Mooney viscosity of the aqueous adhesive is preferably not less than 2. The Mooney viscosity ($ML_{1+4}$ (100° C.)) of the aqueous adhesive is measured in accordance with the standard of "JIS K6300" after the aqueous adhesive is dried to remove a water content. The measurement conditions are as follows.

Rotor: L rotor
Preheating time: 1 minute
Rotating time of rotor: 4 minutes
Temperature: 100° C.

In light of adhesiveness to the immersed melton, a viscosity of the aqueous adhesive is preferably not less than 10 Pa·s and more preferably not less than 15 Pa·s. In light of fluidity, the viscosity of the aqueous adhesive is preferably not greater than 25 Pa·s and more preferably not greater than 20 Pa·s. The viscosity of the aqueous adhesive is measured at a temperature of 23±1° C. by using a Brookfield rotational viscometer (rotor: No. 3) in accordance with the description in JIS Z8803 "Methods for viscosity measurement of liquid". In a case where the viscosity is not greater than 20 Pa·s, the rotation speed is 10 rpm. In a case where the viscosity is greater than 20 Pa·s, the rotation speed is 5 rpm.

A method for producing the aqueous adhesive for a tennis ball is not particularly limited. For example, the liquid rubber latex and the solid rubber latex are blended such that a ratio of the liquid rubber to the entire rubber component is greater than 20% by weight and less than 90% by weight, and, thereafter, the additives such as the vulcanization accelerator, the inorganic filler, and the like are sequentially added and mixed, thereby producing the aqueous adhesive. The additives such as the vulcanization accelerator and the like may be mixed, as they are, with the rubber latex, or may be mixed as respective slurries of the additives.

The slurry of each additive is obtained by putting the additive in a dispersion medium containing a dispersant and mixing them. A kind of the dispersant contained in the dispersion medium is not particularly limited, and the dispersant is selected as appropriate from anionic, nonionic, and cationic surfactants according to a kind of the additive and the concentration of the slurry, and used. Examples of the anionic surfactant include a C8 to C20 alkylsulfonate, alkylaryl sulfate, sodium naphthalenesulfonate-formaldehyde condensates, and alkali metal salts of rosin acids. Examples of the nonionic surfactant include aromatic polyglycol ether, polyvinyl alcohol, polyoxyethylene alkyl ether, and polyoxyethylene monostearate. Examples of the cationic surfactant include dilauryldimethylammonium chloride, hexadecyltrimethylammonium chloride, octadecyltrimethylammonium chloride, and dodecyltrimethylammonium chloride. The anionic or nonionic surfactant is preferable. Two or more kinds of the surfactants may be used in combination.

In light of stability of the slurry, a concentration of the dispersant in the dispersion medium is preferably not less than 0.5% by weight and more preferably not less than 1.0% by weight. In light of the adhesive strength of the obtained adhesive, the concentration of the dispersant in the dispersion medium is preferably not greater than 20% by weight and more preferably not greater than 15% by weight.

The dispersion medium can also be used for adjusting the solid content concentration of the liquid rubber latex and the solid rubber latex. After the liquid rubber latex and the solid rubber latex are blended, the solid content concentration may be adjusted by adding the dispersion medium. After the liquid rubber latex and the solid rubber latex are blended and each additive is thereafter added to mix them, the solid content concentration may be adjusted by using the dispersion medium.

The aqueous adhesive for a tennis ball can be preferably used for producing, for example, regulation tennis balls. FIG. 1 shows a tennis ball 2 obtained by using the aqueous adhesive according to one embodiment of the present disclosure. The tennis ball 2 includes a hollow core 4, two pieces of felt 6 covering the core 4, and a seam 8 positioned in a gap between the two pieces of the felt 6. The thickness of the core 4 is about 3 mm to 4 mm in general. The inside of the core 4 is filled with compressed gas. The two pieces of the felt 6 are adhered to the surface of the core 4 by the adhesive.

Figure 2A:
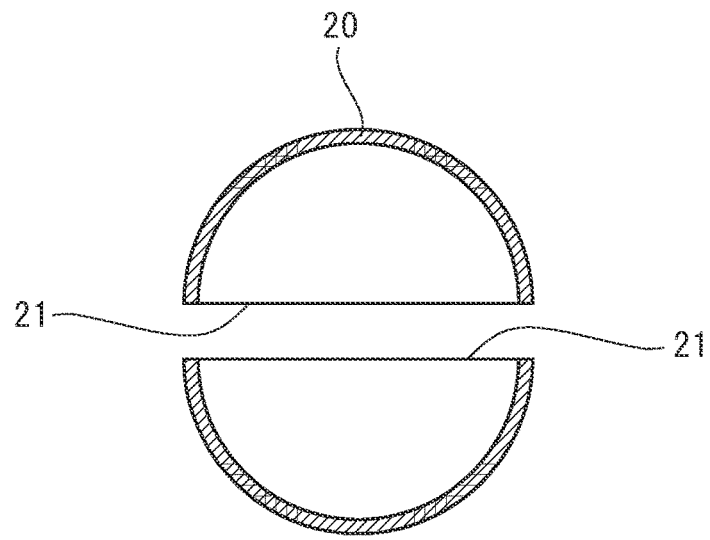
FIG. 2A is a cross-sectional view illustrating forming of a core of the tennis ball shown in FIG. 1.
Figure 2B:
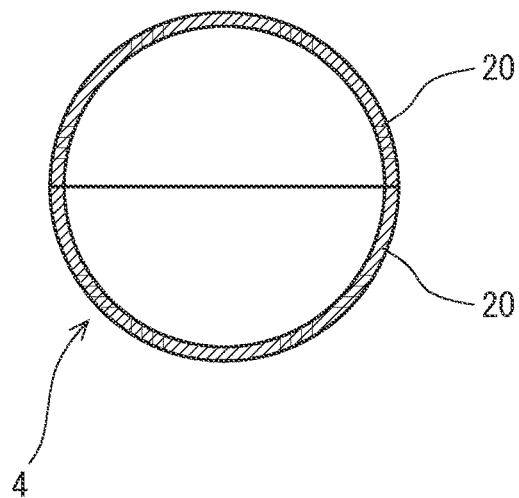
FIG. 2B is a cross-sectional view illustrating the forming of the core of the tennis ball shown in FIG. 1.

FIG. 2 is a cross-sectional view illustrating forming of the core 4 of the tennis ball 2 shown in FIG. 1. As shown in FIG. 2A, two half cores 20 are firstly prepared in the forming of the core 4. Each of the half cores 20 is hemispherical-shell-shaped, and has an annular edge 21. Next, the aqueous adhesive, for a tennis ball, according to the present disclosure is applied to the edge 21 of each half core 20, and water and tablets of sodium chloride and sodium nitrite are put into one of the half cores 20. Thereafter, as shown in FIG. 2B, the two half cores 20 are adhered to each other at the respective edges 21. The spherical body formed of the two half cores 20 is put into a predetermined mold, and heated and pressurized, thereby forming the hollow core 4.

The core 4 is formed by crosslinking a rubber composition containing base rubber, a vulcanizing agent, a vulcanization accelerator, a filler, and the like. Preferable examples of the base rubber include natural rubber, polybutadiene, polyisoprene, styrene-butadiene copolymers, acrylonitrile-butadiene copolymers, polychloroprene, ethylene-propylene copolymers, ethylene-propylene-diene copolymers, isobutylene-isoprene copolymers, and acrylic rubber. The base rubber is more preferably natural rubber and polybutadiene. As the base rubber, two or more kinds of the rubbers may be used in combination. The rubber composition of the core 4 may further contain an additive such as a vulcanization aid, an anti-aging agent, an antioxidant, a light stabilizer, a softener, a processing aid, a coloring agent, or the like.

The method for producing the rubber composition is not particularly limited as long as the object of the present disclosure is achieved. For example, the rubber composition may be produced by heating and pressurizing a kneaded product obtained by putting and kneading the base rubber and the additives selected as appropriate, in a known kneading machine such as a Banbury mixer, a kneader, a roll, or the like. The kneading conditions and the vulcanization conditions are selected according to blending in the rubber composition. The kneading temperature is preferably not lower than 50° C. and not higher than 180° C. The vulcanization temperature is preferably not lower than 140° C. and not higher than 180° C. The vulcanization time is preferably not shorter than two minutes and not longer than 60 minutes.

Next, woven felt is cut so as to be dumbbell-shaped, and multiple pieces of the felt 6 (melton) are prepared. The multiple pieces of the felt 6 are stacked and thereafter immersed in the above-described aqueous adhesive, whereby the aqueous adhesive is adhered to side surfaces (cut faces) of the multiple pieces of the felt 6. Thereafter, the aqueous adhesive is dried, whereby the side surfaces of the multiple pieces of the felt 6 are adhered to each other by the unvulcanized rubber composition. Among the multiple adhered pieces of the felt 6, two pieces of the felt 6 are separated and adhered to the outer surface of the core 4, and pressurized and heated. The rubber composition adhered to the side surface of the felt 6 is vulcanized by the pressurization and heating to obtain the tennis ball 2 having the seam 8 formed in a gap between the two pieces of the felt.

The aqueous adhesive for a tennis ball has good tackiness, separability, and transition resistance. Therefore, the felt 6 having an appropriate amount of unvulcanized rubber composition adhered to the side surface can be efficiently obtained. The aqueous adhesive has appropriate fluidity during vulcanization. Therefore, the seam 8 can be formed in a gap between the two pieces of the felt 6 without forming spaces. The tennis ball 2 having the seam 8 has high durability. The aqueous adhesive allows a high quality tennis ball 2 to be efficiently produced.

EXAMPLES

The following will show the effects according to the present disclosure by means of Examples, but the present disclosure should not be construed in a limited manner on the basis of the description of these Examples.

Example 1

(Preparation of Dispersion Medium)

100 parts by weight of purified water, 1.6 parts by weight of Tamol NN 9104 (manufactured by BASF, naphthalene sulfonic acid/formaldehyde condensate, sodium salt), 0.6 parts by weight of Emulvin W (aromatic polyglycol ether manufactured by LANXESS), and 0.4 parts by weight of ammonia water (manufactured by Wako Pure Chemical Industries, Ltd., concentration of 28% by weight), were blended to obtain a dispersion medium.

(Preparation of Thickener)

50 parts by weight of A-7075 (acrylic polymer emulsion manufactured by TOAGOSEI CO., LTD.) and 9.0 parts by weight of ammonia water (manufactured by Wako Pure Chemical Industries, Ltd., concentration of 28% by weight) were added to 100 parts by weight of purified water to obtain a thickener.

(Preparation of Rubber Latex)

The dispersion medium was added to "KURAPRENE LIR-700 (trade name)" manufactured by Kuraray Co., Ltd. and 1.4-fold dilution was performed, whereby liquid rubber latex having the solid content concentration of 60% by weight was obtained. The obtained liquid rubber latex and solid rubber latex (trade name "Cariflex IR0401 SU" manufactured by Cariflex PTE. Ltd., solid content concentration of 63% by weight) were mixed, and rubber latex E1 in which a ratio between the liquid rubber L-IR and the solid rubber S-IR was 30:70 in terms of solid content was obtained. A part of the rubber latex E1 was collected and dried at 60° C. for 24 hours, and the Mooney viscosity ($ML_{1+4}$ (100° C.)) was thereafter measured. The measurement result is indicated below in Table 1 as "$ML_{1+4}$ (100): rubber component".

(Preparation of Slurry of Additive)

The above-described dispersion medium was added to each of titanium oxide (trade name "Disoertint TB60" manufactured by Behn Meyer), zinc oxide (trade name "Disoertint ZnO60" manufactured by Behn Meyer), silica (trade name "SEAHOSTAR KE W50" manufactured by NIPPON SHOKUBAI CO., LTD.), an anti-aging agent (trade name "K-840" manufactured by Chukyo Yushi Co., Ltd.), and a vulcanization accelerator DPTT (trade name "Nocceler TRA" manufactured by Ouchi Shinko Chemical Industrial Co., Ltd.), and each of the obtained products was stirred by using a ball mill for 24 hours, thereby preparing each slurry having a solid content concentration of 60% by weight.

(Preparation of Aqueous Adhesive)

While the obtained rubber latex E1 was stirred at 150 rpm by using a Three-One motor, the slurry of titanium oxide, the slurry of zinc oxide, the slurry of silica, the slurry of the anti-aging agent, and the slurry of the vulcanization accelerator were sequentially added, and the above-described thickener was thereafter added to adjust the viscosity to 15 to 20 Pa·s, thereby obtaining an aqueous adhesive of Example 1. As a solid content composition in the aqueous adhesive of Example 1, 7.22 parts by weight of titanium oxide, 5 parts by weight of zinc oxide, 8 parts by weight of silica, 0.51 parts by weight of the anti-aging agent, and 2.54 parts by weight of the vulcanization accelerator were contained with respect to 100 parts by weight of the entire rubber component. A part of the obtained aqueous adhesive was collected and dried at 60° C. for 24 hours, and the Mooney viscosity ($ML_{1+4}$ (100° C.)) was thereafter measured. The measurement result is indicated below in Table 1 as "$ML_{1+4}$ (100° C.): aqueous adhesive".

Examples 2 to 4 and Comparative Examples 1 to 9

Aqueous adhesives according to Examples 2 to 4 and Comparative examples 1 to 9 were obtained in the same manner as in Example 1 except that the kinds and the blending ratios of the rubber components were as indicated below in Tables 1 to 3. For Examples 2 to 4 and Comparative examples 1 to 8, similarly to Example 1, the Mooney viscosity ($ML_{114}$ (100° C.)) of the rubber latex was measured. For Examples 2 to 4 and Comparative examples 1 to 5, similarly to Example 1, the Mooney viscosity ($ML_{1+4}$ (100° C.)) of the aqueous adhesive was measured. For Comparative examples 6 to 8, the Mooney viscosity of the aqueous adhesive was anticipated as being outside the preferable range according to the measurement result of the rubber latex, and, therefore, was not measured. The Mooney viscosity of Comparative example 9 was not measured. The obtained results are indicated below in Tables 1 to 3. In Tables 1 to 3, "ND" represents "detection limit or less", and "*" represents "measurement was impossible under the same conditions".

Reference Example

As Reference example, a conventional organic solvent-based adhesive was prepared. Specifically, 100 parts by weight of natural rubber (trade name "SMR CV60" manufactured by Astlett Rubber Inc.), 5 parts by weight of zinc oxide (trade name "GINREI R" manufactured by Toho Zinc Co., Ltd.), 7.22 parts by weight of titanium oxide (trade name "KR-380" manufactured by Titan Kogyo, Ltd.), 8 parts by weight of silica (trade name "ULTRASIL VN3GR" manufactured by Evonik Industries), 0.51 parts by weight of an anti-aging agent (trade name "Wingstay" manufactured by ELIOKEM), and 2.54 parts by weight of a vulcanization accelerator DPTT (trade name "Nocceler TRA" manufactured by Ouchi Shinko Chemical Industrial Co., Ltd.) were kneaded by a pressure kneader, to obtain a rubber composition. The rubber composition was dissolved in 60 parts by weight of naphtha, thereby obtaining an organic solvent-based adhesive of Reference example. The Mooney viscosity ($ML_{1+4}$ (100° C.)) of natural rubber as the rubber component was 60. Naphtha was left in a use state of the organic solvent-based adhesive, and the organic solvent-based adhesive was not able to be simply compared with the aqueous adhesive used in a dry state. Therefore, the Mooney viscosity was not measured for an adhesive of Reference example.

[Evaluation of Separability, Tackiness, and Transition Resistance]

Woven felt was punched so as to be dumbbell-shaped, and multiple pieces of melton were obtained. Several tens of pieces of the melton were stacked, held between two end plates, and immersed in the aqueous adhesive for 20 seconds. After the immersion, the aqueous adhesive adhered to the side surfaces of the stacked pieces of the melton was dried for 48 hours. After the drying, separability of the fixed pieces of the melton from each other, tackiness, and transition resistance were evaluated based on the following criteria. Separability, tackiness, and transition resistance were similarly evaluated for the organic solvent-based adhesive of Reference example. The evaluation results obtained for the aqueous adhesives of Examples 1 to 4 and Comparative examples 1 to 9 and the organic solvent-based adhesive of Reference example are indicated below in tables 1 to 3.

<Separability>: Separability of the adhered pieces of the melton from each other and deformation at the time of the separation were observed.

A • • • The melton did not extend at the time of the separation.

B • • • The melton extended at the time of the separation.

C • • • Separation was impossible.

<Tackiness>: Adhesiveness of the pieces of the melton to each other and change with the passage of time were observed.

A • • • A plurality of pieces of the melton were adhered to each other after drying and were not separated after passage of time.

B • • • A plurality of pieces of the melton were adhered to each other after drying but were separated after passage of time.

C • • • The pieces of the melton were separated soon after drying.

<Transition resistance>: Adhesion was observed when other melton was brought into contact with dried seam glue.

A • • • The melton was not adhered.

B • • • The melton was adhered but was separable.

C • • • The melton was not able to be separated after being adhered to the dried seam glue.

TABLE 1

|  | Ref. Ex. | Ex. 1 | Ex. 2 | Ex. 3 | Ex. 4 |
|---|---|---|---|---|---|
| Rubber component S-IR [wt. %] | — | 70 | 50 | 30 | 20 |
| L-IR [wt. %] | — | 30 | 50 | 70 | 80 |
| NR [wt. %] | — | — | — | — | — |
| VP [wt. %] | — | — | — | — | — |
| SBR [wt. %] | — | — | — | — | — |
| Natural rubber [wt. %] | 100 | — | — | — | — |
| $ML_{1+4}$ (100): rubber component | 60 | 3.8 | 0.8 | ND | ND |
| $ML_{1+4}$ (100): aqueous adhesive | — | 8.8 | 5.8 | 5.3 | 3.1 |
| Separability | A | A | A | A | A |
| Tackiness | A | A | A | A | A |
| Transition resistance | A | A | A | A | A |

TABLE 2

|  | Comp. Ex. 1 | Comp. Ex. 2 | Comp. Ex. 3 | Comp. Ex. 4 |
|---|---|---|---|---|
| Rubber component S-IR [wt. %] | 90 | 80 | 10 | 100 |
| L-IR [wt. %] | 10 | 20 | 90 | — |
| NR [wt. %] | — | — | — | — |
| VP [wt. %] | — | — | — | — |
| SBR [wt. %] | — | — | — | — |
| $ML_{1+4}$ (100): | 42.4 | 9.1 | ND | 87.1 |

TABLE 2-continued

|  | Comp. Ex. 1 | Comp. Ex. 2 | Comp. Ex. 3 | Comp. Ex. 4 |
|---|---|---|---|---|
| rubber component $ML_{1+4}$ (100): aqueous adhesive | 44.5 | 13.2 | 1.8 | 88.1 |
| Separability | C | B | A | C |
| Tackiness | B | B | A | B |
| Transition resistance | A | A | C | A |

TABLE 3

|  | Comp. Ex. 5 | Comp. Ex. 6 | Comp. Ex. 7 | Comp. Ex. 8 | Comp. Ex. 9 |
|---|---|---|---|---|---|
| Rubber component | — | — | — | — | — |
| S-IR [wt. %] |  |  |  |  |  |
| L-IR [wt. %] | 100 | — | — | — | — |
| NR [wt. %] | — | 100 | — | — | — |
| VP [wt. %] | — | — | 100 | — | — |
| SBR [wt. %] | — | — | — | 100 | — |
| Depolymerized natural rubber [wt. %] | — | — | — | — | 100 |
| $ML_{1+4}$ (100): rubber component | * | 90.5 | 35.0 | 29.6 | — |
| $ML_{1+4}$ (100): aqueous adhesive | * | — | — | — | — |
| Separability | A | C | C | C | B |
| Tackiness | A | C | B | C | B |
| Transition resistance | C | A | A | A | A |

Details of the compounds indicated in Tables 1 to 3 are as follows.
- S-IR: rubber component of solid rubber latex (trade name "Cariflex IR0401 SU" manufactured by Cariflex PTE. Ltd.), isoprene rubber
- L-IR: rubber component of liquid rubber latex (liquid rubber latex manufactured by Kuraray Co., Ltd., trade name "KURAPRENE LIR-700"), isoprene rubber
- NR: rubber component of solid rubber latex (solid rubber latex available from Nomura Trading Co., Ltd., "HYTEX-HA"), natural rubber
- VP: rubber component of solid rubber latex (solid rubber latex manufactured by NIPPON A&L INC., trade name "PYRATEX"), 2-vinylpyridine-modified styrene butadiene rubber
- SBR: rubber component of solid rubber latex (solid rubber latex manufactured by Asahi Kasei Corp., trade name "SB latex A-7141"), carboxy-modified styrene butadiene rubber
- Natural rubber: trade name "SMR CV60" manufactured by Astlett Rubber Inc.
- Depolymerized natural rubber: rubber component of solid rubber latex (depolymerized natural rubber latex manufactured by Regitex Co., Ltd., trade name "DPL-51")

Table 1 indicates that the rubber component of the aqueous adhesive according to each of the Examples had the Mooney viscosity that was substantially less than that of the rubber component of the organic solvent-based adhesive of Reference example. As a result, by the aqueous adhesives of the Examples, separability, tackiness, and transition resistance equivalent to those of Reference example were obtained. Furthermore, as indicated in Tables 1 to 3, evaluations for the aqueous adhesives of the Examples were higher than evaluations for the aqueous adhesives of the Comparative examples. The evaluation results clearly indicate that the technique of the present disclosure is superior.

The aqueous adhesive described above is applicable to production of various hollow balls. The above descriptions are merely illustrative examples, and various modifications can be made without departing from the principles of the present disclosure.

[Disclosure Contents]

The following items each represent disclosure of the preferred embodiment.

According to one aspect, an aqueous adhesive for a tennis ball includes rubber latex. The rubber latex is a mixture of liquid rubber latex and solid rubber latex. A ratio of liquid rubber to an entire rubber component contained in the rubber latex is greater than 20% by weight and less than 90% by weight in terms of solid content.

According to one aspect, a Mooney viscosity ($ML_{1+4}$ (100° C.)) of a rubber component contained in the rubber latex may be not greater than 6.0. According to one aspect, the Mooney viscosity ($ML_{1+4}$ (100° C.)) of the aqueous adhesive may be not greater than 10. According to one aspect, a number average molecular weight of the liquid rubber may be not less than 10,000 and not greater than 60,000.

According to one aspect, the aqueous adhesive may further include a thiuram-based vulcanization accelerator. According to one aspect, the liquid rubber may be isoprene rubber. Furthermore, according to one aspect, solid rubber may be isoprene rubber.

According to one aspect, the aqueous adhesive may include a vulcanization accelerator of not less than 1.5 parts by weight and not greater than 3.5 parts by weight with respect to 100 parts by weight of the rubber component in terms of solid content.

According to one aspect, the aqueous adhesive may further include an inorganic filler of not less than 5 parts by weight and not greater than 40 parts by weight with respect to 100 parts by weight of the rubber component in terms of solid content.

According to one aspect, a total solid content concentration of the aqueous adhesive may be not less than 5.0% by weight and not greater than 80% by weight.

From another viewpoint, according to one aspect, a tennis ball includes: a core; two pieces of felt covering the core; and a seam positioned in a gap between the two pieces of the felt. The seam is formed of any of the above-described aqueous adhesives.

What is claimed is:

1. A tennis ball comprising:
   a core;
   two pieces of felt covering the core; and
   a seam positioned in a gap between the two pieces of the felt, wherein
   the seam is formed of an aqueous adhesive,
   the aqueous adhesive comprises rubber latex,
   the rubber latex is a mixture of liquid rubber latex and solid rubber latex,
   a ratio of liquid rubber to an entire rubber component contained in the rubber latex is greater than 20% by weight and less than 90% by weight in terms of solid content, and
   a Mooney viscosity ($ML_{1+4}$ (100° C.)) of a rubber component comprising the liquid rubber latex and the solid rubber latex is not greater than 6.0.

2. The tennis ball according to claim 1, wherein a Mooney viscosity ($ML_{1+4}$ (100° C.)) of the aqueous adhesive is not greater than 10.

3. The tennis ball according to claim 1, wherein a number average molecular weight of the liquid rubber is not less than 10,000 and not greater than 60,000.

4. The tennis ball according to claim 1, wherein the aqueous adhesive further comprises a thiuram-based vulcanization accelerator.

5. The tennis ball according to claim 1, wherein the liquid rubber latex is isoprene rubber.

6. The tennis ball according to claim 1, wherein the solid rubber latex is isoprene rubber.

7. The tennis ball according to claim 1, wherein the aqueous adhesive further comprises a vulcanization accelerator in an amount of not less than 1.5 parts by weight and not greater than 3.5 parts by weight with respect to 100 parts by weight of the entire rubber component in terms of solid content.

8. The tennis ball according to claim 1, wherein the aqueous adhesive further comprises an inorganic filler in an amount of not less than 5 parts by weight and not greater than 40 parts by weight with respect to 100 parts by weight of the entire rubber component in terms of solid content.

9. The tennis ball according to claim 1, wherein a total solid content concentration of the aqueous adhesive is not less than 5.0% by weight and not greater than 80% by weight.

10. The tennis ball according to claim 1, wherein the solid rubber latex is not a natural rubber latex.

\* \* \* \* \*